(12) United States Patent
Fernando et al.

(10) Patent No.: US 11,640,378 B2
(45) Date of Patent: *May 2, 2023

(54) ARCHIVING OBJECTS IN A DATABASE ENVIRONMENT

(71) Applicant: salesforce.com, inc., San Francisco, CA (US)

(72) Inventors: Jan Asita Fernando, San Francisco, CA (US); Samarpan Jain, San Francisco, CA (US); Matthew Davidchuk, San Francisco, CA (US); Valliappan Annamalai Natarajan, San Francisco, CA (US); Alexey Syomichev, San Francisco, CA (US); Cody Marcel, San Francisco, CA (US); Seshank Kalvala, San Francisco, CA (US); Sahil Ramrakhyani, San Francisco, CA (US); Alexandre Hersans, San Francisco, CA (US)

(73) Assignee: salesforce.com,inc., San Francisco, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/358,573

(22) Filed: Jun. 25, 2021

(65) Prior Publication Data

US 2021/0318997 A1 Oct. 14, 2021

Related U.S. Application Data

(63) Continuation of application No. 16/241,810, filed on Jan. 7, 2019, now Pat. No. 11,068,448.

(51) Int. Cl.
*G06F 16/00* (2019.01)
*G06F 16/21* (2019.01)
(Continued)

(52) U.S. Cl.
CPC ............ *G06F 16/211* (2019.01); *G06F 16/24* (2019.01); *G06F 16/28* (2019.01)

(58) Field of Classification Search
CPC ........ G06F 16/211; G06F 16/24; G06F 16/28; G06F 16/213; G06F 16/245
See application file for complete search history.

(56) References Cited

U.S. PATENT DOCUMENTS 7,730,478 B2 6/2010 Weissman
7,779,039 B2 8/2010 Weissman et al.
(Continued)

FOREIGN PATENT DOCUMENTS

WO WO2018064375 A1 4/2018

OTHER PUBLICATIONS

Schaffner et al., "Towards Enterprise Software as a Service in the Cloud," ICDE Workshops 2010, IEEE, pp. 52-59. (Year: 2010).*

(Continued)

*Primary Examiner* — Cheryl Lewis
(74) *Attorney, Agent, or Firm* — Haynes and Boone LLP

(57) ABSTRACT

A method is provided for processing a query. In some embodiments, the method includes creating a historical schema defining an ordered set of fields based on a current schema of an object and a field modification of the current schema. The method includes inserting, based on the field modification, a new field at an end of the historical schema and archiving records into a second storage device. The method includes receiving a query, which includes a command specifying a subset of fields and which indicates a non-current field. The method includes searching in the second storage device for archive records having a second schema including the subset of fields and the non-current field. The first and second schemas follow the field order in accordance with the historical schema. The method further (Continued)

includes accessing the subset of fields and the non-current field in accordance with the command.

20 Claims, 9 Drawing Sheets

(51) Int. Cl.
   *G06F 16/24* (2019.01)
   *G06F 16/28* (2019.01)

(56) References Cited

U.S. PATENT DOCUMENTS

| | | | |
|---|---|---|---|
| 8,560,554 | B2 | 10/2013 | Gradin et al. |
| 8,560,575 | B2 | 10/2013 | Gradin et al. |
| 9,088,459 | B1 | 7/2015 | Gao et al. |
| 9,195,854 | B2 | 11/2015 | Jain et al. |
| 9,240,016 | B2 | 1/2016 | Cronin et al. |
| D750,644 | S | 3/2016 | Bhutan et al. |
| 9,390,428 | B2 | 7/2016 | Rehman et al. |
| 9,417,840 | B2 | 8/2016 | Pradeep et al. |
| 9,418,077 | B2 | 8/2016 | Hersans et al. |
| 9,454,767 | B2 | 9/2016 | Cronin et al. |
| 9,632,849 | B2 | 4/2017 | Pradeep et al. |
| 9,646,169 | B2 | 5/2017 | Wong et al. |
| 9,658,801 | B2 | 5/2017 | Pradeep et al. |
| 9,690,815 | B2 | 6/2017 | Cronin et al. |
| 9,753,962 | B2 | 9/2017 | Petschulat et al. |
| 9,767,022 | B2 | 9/2017 | Pradeep et al. |
| 9,767,040 | B2 | 9/2017 | Pradeep et al. |
| 10,037,233 | B2 | 7/2018 | Pradeep et al. |
| 10,037,430 | B2 | 7/2018 | Jain et al. |
| 10,089,488 | B2 | 10/2018 | Wong et al. |
| 10,178,156 | B2 | 1/2019 | Pradeep et al. |
| 10,482,106 | B2 | 11/2019 | Oksman et al. |
| 10,628,395 | B2 | 4/2020 | Simon et al. |
| 10,860,557 | B2 | 12/2020 | Eberl et al. |
| 2011/0106808 | A1 | 5/2011 | Hersans et al. |
| 2011/0282872 | A1 | 11/2011 | Oksman et al. |
| 2012/0078981 | A1 | 3/2012 | Gradin et al. |
| 2014/0019459 | A1 | 1/2014 | Gradin et al. |
| 2014/0032533 | A1 | 1/2014 | Hersans et al. |
| 2014/0074558 | A1 | 3/2014 | Jain et al. |
| 2014/0173702 | A1 | 6/2014 | Wong et al. |
| 2014/0222814 | A1 | 8/2014 | Gradin et al. |
| 2015/0127670 | A1 | 5/2015 | Torman et al. |
| 2016/0041976 | A1 | 2/2016 | Pradeep et al. |
| 2016/0078120 | A1 | 3/2016 | Pradeep et al. |
| 2016/0105459 | A1 | 4/2016 | Esary et al. |
| 2016/0179825 | A1 | 6/2016 | Bertin et al. |
| 2016/0253360 | A1 | 9/2016 | Gradin et al. |
| 2016/0306527 | A1 | 10/2016 | Davidchuk et al. |
| 2016/0313983 | A1 | 10/2016 | Davidchuk et al. |
| 2016/0328132 | A1 | 11/2016 | Davidchuk et al. |
| 2017/0075540 | A1 | 3/2017 | Hausler et al. |
| 2017/0075919 | A1 | 3/2017 | Bose et al. |
| 2017/0075922 | A1 | 3/2017 | Torman et al. |
| 2017/0076252 | A1 | 3/2017 | Hausler et al. |
| 2017/0169195 | A1 | 6/2017 | LiSanti et al. |
| 2017/0293632 | A1 | 10/2017 | Pradeep et al. |
| 2017/0308604 | A1 | 10/2017 | Gray et al. |
| 2017/0339148 | A1 | 11/2017 | Syomichev et al. |
| 2018/0013794 | A1 | 1/2018 | Esary et al. |
| 2018/0025113 | A1 | 1/2018 | Torman et al. |
| 2018/0095790 | A1 | 4/2018 | Pradeep et al. |
| 2018/0096012 | A1 | 4/2018 | Warshavsky et al. |
| 2018/0096013 | A1 | 4/2018 | Warshavsky et al. |
| 2018/0096165 | A1 | 4/2018 | Warshavsky et al. |
| 2018/0150482 | A1 | 5/2018 | Gradin et al. |
| 2018/0165309 | A1 | 6/2018 | Tajuddin et al. |
| 2018/0225159 | A1 | 8/2018 | Pradeep et al. |
| 2018/0293253 | A1 | 10/2018 | Oravivattanakul et al. |
| 2018/0293258 | A1 | 10/2018 | Oravivattanakul et al. |
| 2018/0307466 | A1 | 10/2018 | Davidchuk et al. |
| 2018/0307763 | A1 | 10/2018 | Hersans et al. |
| 2018/0322168 | A1 | 11/2018 | Levine et al. |
| 2019/0042573 | A1 | 2/2019 | Marcel et al. |
| 2019/0042622 | A1 | 2/2019 | Marcel et al. |
| 2019/0042623 | A1 | 2/2019 | Marcel et al. |
| 2019/0057101 | A1 | 2/2019 | Esserlieu et al. |
| 2019/0065699 | A1 | 2/2019 | Bose et al. |
| 2019/0095260 | A1 | 3/2019 | Pradeep et al. |
| 2019/0095532 | A1 | 3/2019 | Levine et al. |
| 2019/0095533 | A1 | 3/2019 | Levine et al. |
| 2019/0095534 | A1 | 3/2019 | Levine et al. |
| 2019/0097791 | A1 | 3/2019 | Hersans et al. |
| 2019/0114438 | A1 | 4/2019 | Hersans et al. |
| 2019/0236198 | A1 | 8/2019 | Fernando et al. |
| 2019/0236284 | A1 | 8/2019 | Hersans |
| 2019/0238653 | A1 | 8/2019 | Syomichev et al. |
| 2019/0310899 | A1 | 10/2019 | Oravivattanakul et al. |
| 2019/0325039 | A1 | 10/2019 | Fernando et al. |
| 2019/0332315 | A1 | 10/2019 | Oravivattanakul et al. |
| 2019/0370363 | A1 | 12/2019 | Hersans et al. |
| 2020/0302392 | A1 | 9/2020 | Shah et al. |

OTHER PUBLICATIONS

Curino et al., "Automating Database Schema Evolution in Information System Upgrades," HotSWUp'09, Oct. 25, 2009, pp. 1-5. (Year: 2009).*

Boytsov et al., "Multi-Tenant Database Clusters for Saas", In Proceedings of the Second International Symposium on Business Modeling and Software Design (BMSD 2012), pp. 144-149, 2012. (Year: 2012).

Schaffner et al., "Analytics on Historical Data Using a Clustered Insert-Only In-Memory Column Database", IEEE, 2009, pp. 704-708. (Year: 2009).

Ahmad et al., "Predicting System Performance for Multi-Tenant Database Workloads", DBTest'Jun. 11, 13, 2011, ACM, pp. 1-3. (Year: 2011).

* cited by examiner

ARCHIVING OBJECTS IN A DATABASE ENVIRONMENT

CROSS REFERENCE(S)

The present application is a continuation of and claims priority under 35 U.S.C. 120 to U.S. application Ser. No. 16/241,810, filed on Jan. 7, 2019, now U.S. Pat. No. 11,068,448 which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a computing device, and more specifically to systems and methods for archiving records in a database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

Figure 1:
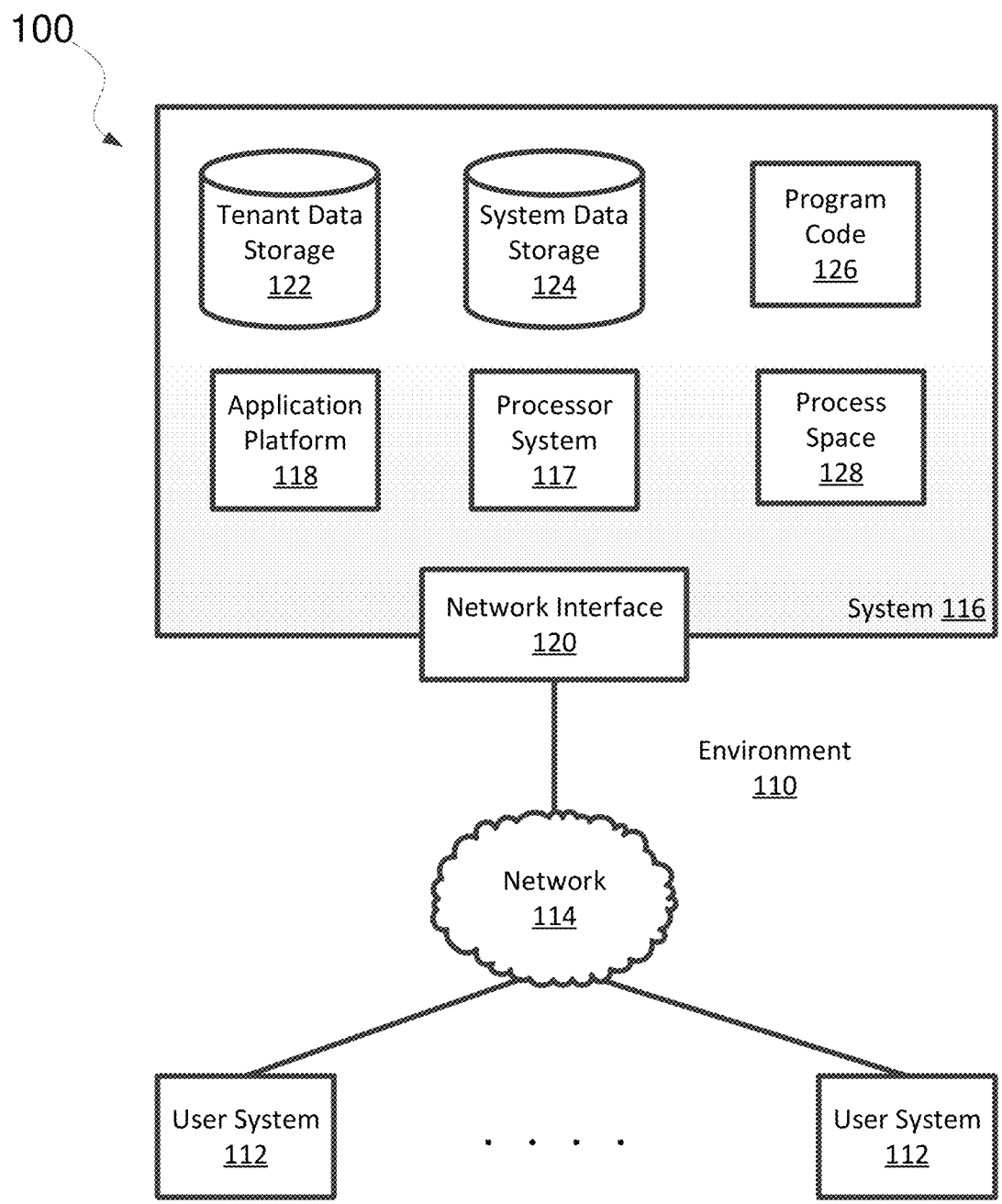
FIG. 1 illustrates a block diagram of an example environment according to some embodiments.

In the figures, elements having the same designations have the same or similar functions.

I. Example Environment
II. Archiving Records into a Second Storage Device
   A. Records Based on Customized Objects
   B. Schema Drift Over Time
   C. Migration of Original Records into the Second Storage Device
   D. Example Timing Diagram
   E. Maintenance of Metadata and a Historical Schema
III. Query Processing
   A. Query the First Data Storage Storing Values for Current Fields
   B. Query the Second Data Storage Storing Archive Records
      1. The Subset of Fields Specified in the Query Matches the Current Fields
      2. The Subset of Fields Specified in the Query Includes a Backdoor Field
      3. The Subset of Fields Specified in the Query Includes a Non-Current Field
   C. Standard Full Record Field
IV. Versions of an Object in a Multi-Tenancy
V. Operational Flow

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

I. Example Environment

The system and methods of the present disclosure can include, incorporate, or operate in conjunction with or in the environment of a database, which in some embodiments can be implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously support multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a MTS, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third-party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cellphone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the MTS) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented database management system (OODBMS) or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
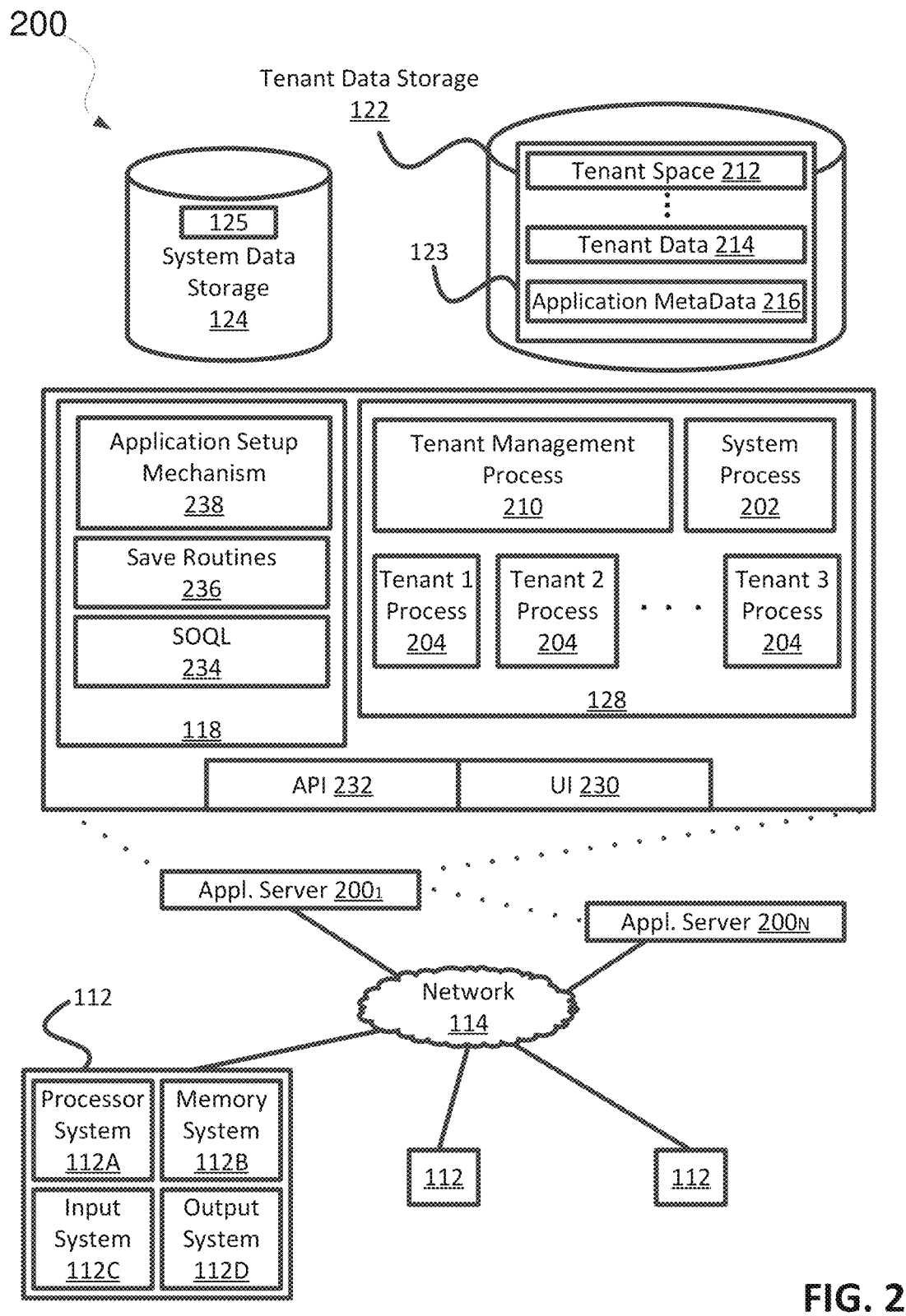
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a Salesforce.com object query language (SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIGS. 1 and 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access the tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using SOQL 234 that provides a programming language style interface extension to the API 232. Some embodiments of SOQL language are discussed in further detail in U.S. Pat. No. 7,730,478, filed September 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some MTS, standard entity tables might be provided for use by all tenants.

In some MTSs, tenants may be allowed to create and store custom objects, or they may be allowed to customize standard entities or objects, for example by creating custom fields for standard objects, including custom index fields. Systems and methods for creating custom objects as well as customizing standard objects in a MTS are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Archiving Records into a Second Storage Device

Various users interacting with a system, such as a MTS, may manage and control data stored in the MTS. The term "user" may refer to an "entity," a "tenant," or an "organization." Users may store data via an object, which may come with a set of standard fields. Each tenant may customize its own version of the object based on, for example, its business practices and the information it desires to save and maintain. For example, an accounting firm may desire to add customized fields for storing client information (e.g., client names, client addresses, billing arrangement, end of the client's fiscal year, etc.). In another example, a temp agency may desire to add customized fields for employees who have been provided with temporary work (e.g., employee names, employee addresses, hourly rates, place of temporary employment, etc.). Accordingly, multiple versions of an object may exist, with each version being specific to a tenant. As will be explained further below, it may be helpful to archive records at a tenant-specific level from the MTS to the second storage device, considering each tenant's set of custom fields.

A. Records Based on Customized Objects

Figure 3:
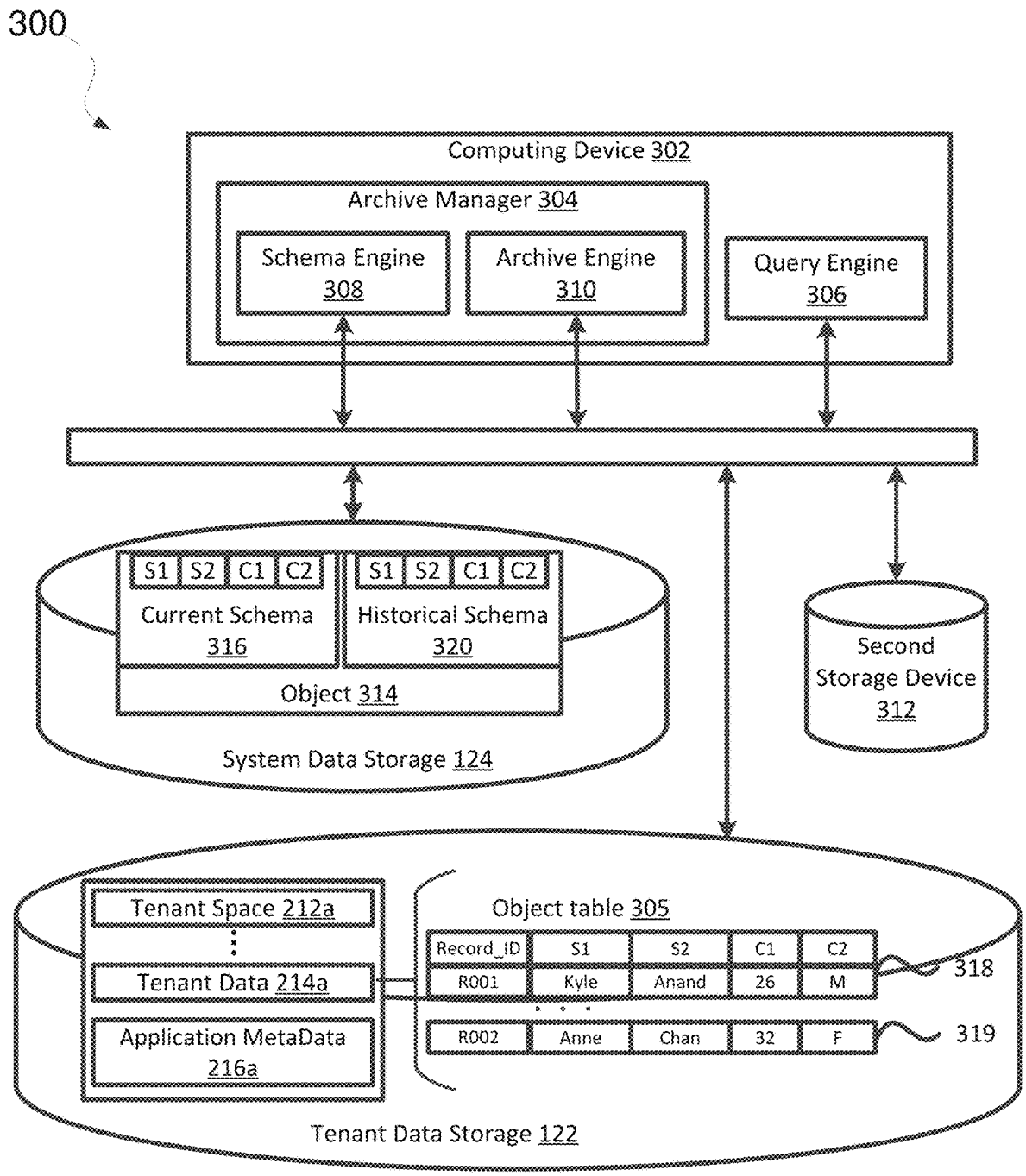
FIG. 3 illustrates a diagram for archiving one or more records stored in a first storage device into a second storage device according to some embodiments.

FIG. 3 illustrates a diagram 300 for archiving one or more records stored in a first storage device into a second storage device according to some embodiments. For example, components of diagram 300 may be, in some examples, implemented as part of the example environment 110. In FIG. 3, a computing device 302 includes an archive manager 304 and a query engine 306. The archive manager 304 includes a schema engine 308 and an archive engine 310. The archive engine 310 archives data stored in the tenant data storage 122 into a second storage device 312.

A plurality of users may store and maintain data in the tenant data storage 122, which may be a MTS having a relational schema. Some users may have a huge amount of data stored in the MTS. For example, a user may store thousands of records in the tenant data storage 122 and desire to archive a subset of these records into a second storage device that is more cost-effective than the tenant data storage 122. Aspects of the disclosure may provide benefits such as easing the workload and thus reducing the burden on the tenant data storage 122. Additionally, although the second storage device 312 may be slower than the tenant data storage 122, the user may benefit from lower storage costs by archiving records into and retrieving records from the second storage device 312 rather than maintaining them in the tenant data storage 122. The archive manager 304 and the query engine 306 may allow the user continued access to the archive records, using existing platform semantics as was previously used by the user for the tenant data storage 122.

The schema engine 308 may maintain and track a current schema 316 and a historical schema 320 of an object 314 in the system data storage 124. The current schema 316 and the historical schema 320 are dynamic and may change over time. The current schema 316 is a subset of the historical schema 320. Additionally, the historical schema 320 maintains fields in a particular order and uses slots as placeholders for each field that was included in the object 314.

In the example illustrated in FIG. 3, the user may insert records into an Object table 305 stored in the tenant data storage 122. Records 318 and 319 may be based on the object 314 having a schema that defines a set of standard fields and a set of custom fields. The current schema 316 defines an ordered set of current fields of the object 314. A standard field is included in each representation of an object. A custom field may be added, removed, or modified by a user. The current schema 316 defines two standard fields and two custom fields, <S1, S2, C1, C2>. The standard fields S1 and S2 may be a person's first name and last name, respectively. The custom fields C1 and C2 may be the person's age and sex, respectively. As shown in the record 318, Kyle Anand is a 26 year-old male. As shown in the record 319, Anne Chan is a 32 year-old female. The user may modify the current schema 316 of the object 314 by adding fields to, removing fields from, and/or modifying the custom fields (e.g., changing a data type). Accordingly, the current schema 316 of the object 314 may change over time.

Although FIGS. 3-7 discuss a single tenant modifying its version of the object 314, it should be understood that multiple tenants may modify their versions of the same object 314, which may each include the two standard fields S1 and S2 and zero or more custom fields specific to the tenant.

B. Schema Drift Over Time

Schema drift occurs when a field definition of an object 314's schema changes over time. For example, if the user removes the field C1 from the current schema 316, the user may no longer be able to access the field C1 in the future. To overcome this problem, the schema engine 308 preserves historical fields of the object 314 by maintaining a historical schema 320 of the object 314. If the user modifies the current schema 316, the schema engine 308 may detect the modification and update the current schema 316 and the historical schema 320 accordingly. The historical schema 320 defines an ordered set of fields based on previous and current schemas of the object 314. In other words, the historical schema 320 keeps track of the current and non-current fields of the object 314 based on an order that defines the serialization format for an archive record. A non-current field is a field that is not present in the object 314's current schema and may also be referred to a historical field. The schema engine 308 may determine the historical schema 320 by snapshotting the current schema 316 and adding fields to an end of the historical schema 320, which defines a superset of fields that have been defined in the object 314.

Schema drift is inherent in the archiving process as users change the current schema 316 of the object 314. For each field modification of the current schema 316, the schema engine 308 may insert the new field at an end of the historical schema 320 to update it. The schema engine 308 maintains the order of the fields defined in the historical schema 320, which provides a timeline of field modification in the object 314. For example, if a first field is stored in a slot preceding a second field in the historical schema 320, the first field may have been added to the current schema 316 before the second field. If the first field is stored in a slot succeeding the second field in the historical schema 320, the second field may have been added to the current schema 316 before the first field. When archiving records into the second storage device 312, the historical schema 320 may be used to insert values into the correct location in the second storage device 312. The historical schema 320 may include current and non-current fields, where non-current fields are those fields that no longer exist in the current schema 316 of the object 314. As discussed in further detail below, when querying from the second storage device 312, the query engine 306 may be used to retrieve those values corresponding to the current fields. Additionally, the query engine 306 may determine, based on the historical schema 320, the physical structure of records stored in the second storage device 312 and retrieve values corresponding to the applicable fields.

If the user adds a field to the current schema 316, the schema engine 308 inserts the added field at an end of the historical schema 320 to update it. If the user modifies a field's data type, the field with the new data type is considered a new field, and schema engine 308 inserts the new field at an end of the historical schema 320 to update it. In this example, if the user inserts a new record, the user writes into the new field (the field with the new data type) rather than the field with the old data type. If the user renames a field in the current schema 316, the field with the new name is considered a new field, and the schema engine 308 inserts the new field at an end of the historical schema 320 to update it. In this example, if the user inserts a new record, the user writes into the field with the new name rather than the field with the old name.

In another example, if the user removes a field from the current schema 316, the schema engine 308 updates the historical schema 320 by leaving it as-is. In other words, if a field is removed from the current schema 316, the schema engine 308 does not modify the historical schema 320. The historical schema 320 preserves all historical field values, and the fields defined in the current schema 316 and the historical schema 320 are dynamic.

Additionally, a field that was historical can be made current again. If a field is deleted, the query engine 306 would not write into that field anymore when new records are added to the tenant data storage 122. If a user re-adds that field in the same way, the query engine 306 may start writing into that field again. If the historical field is pulled back into the current set of fields, then the values that were previously archived for that field may be made available again, even though for a period of time in the past they were not available due to being in the historical set. If the field has a different datatype, however, the query engine 306 may create a new field and write to this new field, even if the field has the same name as the one that had its datatype modified.

Using the historical schema 320, a user may have access to all field(s) that have ever been included in the object 314, even in cases where the metadata no longer exists in the original object for those fields. A user may project and filter on all fields with values in the archive records stored in the second storage device 312, including fields that have been deleted or undergone non-backwards compatible data type changes on the schema of the object 314. For example, if a user removes the field C1 from the current schema 316, users may still be able to project and filter on the field C1 in the archive records because the historical schema 320 maintains its knowledge of the field. Additionally, the users may retrieve values for records that were archived when the field C1 was current on the object 314.

In response to an indication to archive an original record stored in the tenant data storage 122, the archive manager 304 generates, at the second storage device 312, an archive record corresponding to and having the same schema as the original record. The archive manager 304 may copy data stored in each field of the original record to the corresponding archive record stored in the second storage device. After copying the data, the archive manager 304 removes the original record from the tenant data storage 122.

C. Migration of Original Records into the Second Storage Device

Each record includes a record identifier (ID) (e.g., Record_ID column) that identifies a record. In some examples, the archive engine 310 archives original records stored in the tenant data storage 122 by querying record IDs, inserting original records identified by the record IDs into the second storage device 312, and removing the original records from the tenant data storage 122. The administrator for the tenant may provide the record IDS to the archive manager 304 for archiving into the second storage device 312. Other mechanism for identifying and archiving records are within the scope of the disclosure.

Figure 4:
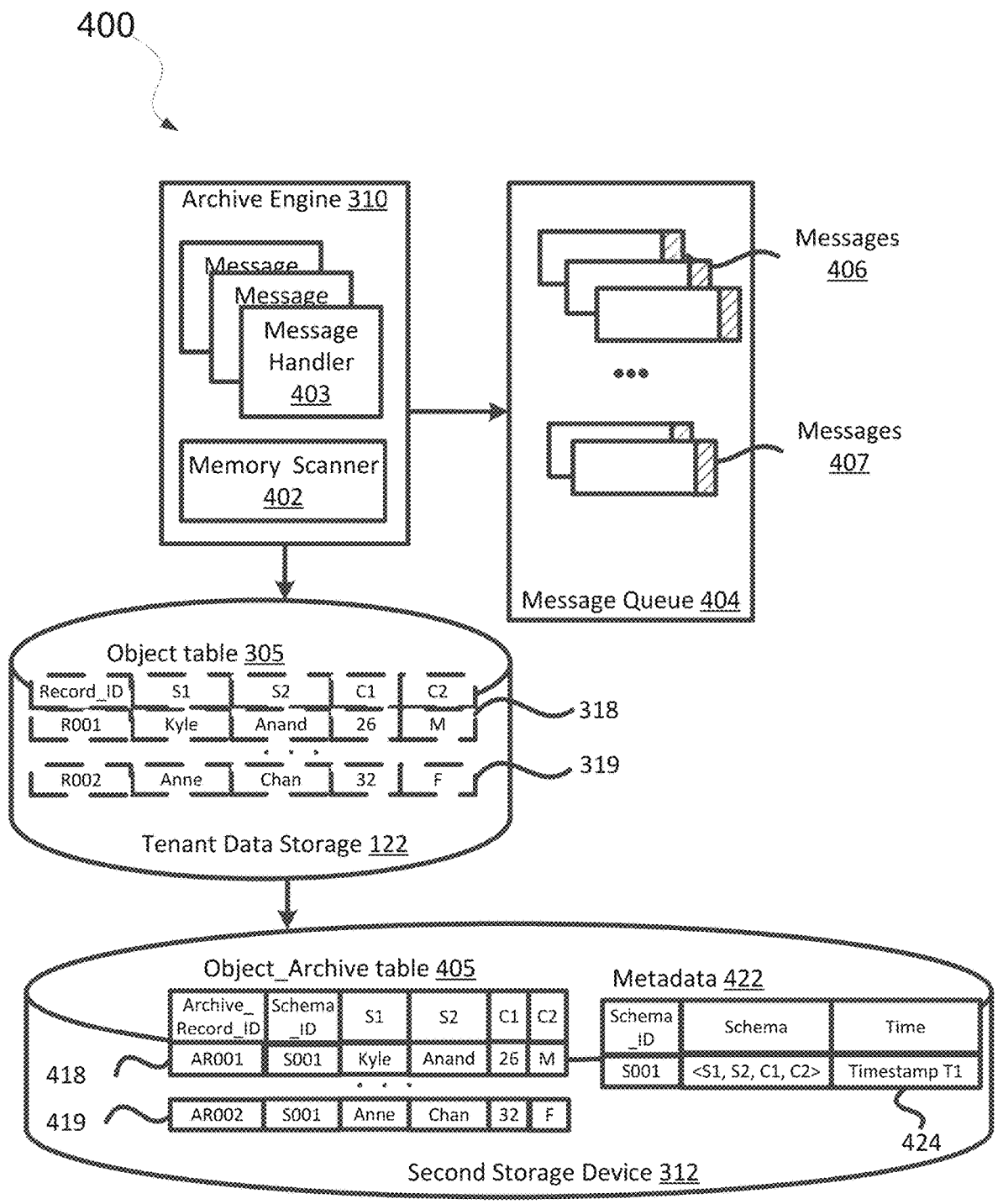
FIG. 4 illustrates a diagram for archiving records into the second storage device according to some embodiments.

FIG. 4 illustrates a diagram 400 for archiving records into the second storage device 312 according to some embodiments. A user may opt into usage of the archive manager 304 by marking one or more records stored in the tenant data storage 122 for archiving into the second storage device 312. In an example, the archive records may be immutable such that once they are archived, they are not modifiable in the second storage device 312. The archive engine 310 maintains a representation of the archive records such that users can interact with the data using familiar platform features and semantics as used by the tenant data storage 122. The archive engine 310 may provide a unified view of the archive and non-archive data via entity interfaces. In an example, the archive records are Parquet files. In an example, the archive records are stored as S3 blobs. In an example, the archive records are stored in HBase®, and Phoenix® is an open source SQL layer on top of HBase®.

In the example illustrated in FIG. 4, the archive engine 310 includes a memory scanner 402 and one or more message handlers 403. The memory scanner 402 scans the memory in the tenant data storage 122 for records that have been marked by one or more users for archiving into the second storage device 312. In an example, the memory scanner 402 is implemented via a cron job, which is a scheduled task. Cron is a LINUX® utility that schedules a command or script to run automatically at a specified time and date. Trademarks are the property of their respective owners. An administrator for the tenant data storage 122 may schedule the memory scanner 402 to execute, for example, once per day. For each user and each marked record, the memory scanner 402 enqueues a message to a message queue 304. Each message 406 may specify the record ID of the record for archiving. The memory scanner 402 enqueues to the message queue 404 a message 406 including the Record_ID R001, which identifies the record 318, and a message 407 including the Record_ID R002, which identifies the record 319.

Additionally, each record itself may be related to one or more other records stored in the tenant data storage 122. The memory scanner 402 may create an archive record graph including records related to the marked records. The memory scanner 402 may identify related records by identifying a cascade-relationship for any marked records and mark these related records for archiving into the second storage device 312. In an example, the record 318 is related to a comment record storing comments entered by one or more users. The comment record may be separate from the record 318 (e.g., stored in an object table different from the record 318) and have a cascade-relationship with the record 318 such that if the record 318 is deleted, the comment record should be deleted as well. The memory scanner 402 enqueues to the message queue 404, messages including the record IDs of records related to the records marked for archiving into the second storage device 312.

The message handler 403 identifies the records for archiving by dequeuing messages from the message queue 404 and processing the messages. One message handler 403 may execute per-user, per-record for archiving. For each message in the message queue 404, the message handler 403 identifies the particular record specified by the message and creates an archive record having the same schema and storing the same data as the particular record at the time of archive. In an example, the archive record 418 mirrors the schema of and data stored in the original record 318, and the archive record 419 mirrors the schema of and data stored in the original record 319.

The schema engine 308 maintains metadata 422 including information about the schemas for archive records. The information may include the schema ID, the schema, and a specific point in time at which the record corresponding to the schema was archived (e.g., a timestamp). The schema ID included in an archive record identifies the schema of the respective archive record. The historical schema 320 and/or the metadata 422 enables the archive manager 304 and the query engine 306 to represent data without destroying the visibility of specific information that was stored in the object 314's modified field.

The schema engine 308 may maintain the current schema 316, the historical schema 320, and the metadata 422 for each separate object, per tenant. The schema engine 308 identifies the schema of an archive record, assigns the schema a Schema ID, and inserts the schema ID along with the schema into the metadata 422. For example, the schema engine 308 inserts into the metadata 422, a record 424 including the Schema ID S001, which identifies the schema <S1, S2, C1, C2>, and a timestamp T1 of the archive of the records 318 and 319. In this way, the schema engine 308 may attach the Schema ID S001 with the archive records AR001 and AR002, allowing the data to be synchronized with the appropriate schema. If the data is queried in the future (e.g., read or write access), the query engine 306 may apply the correct schema to the data stored in the second storage device 312 and provide the user with a view of the data at the correct point in time in the history of the object 314.

The archive engine 310 may maintain an Object_Archive table 405 that stores records archived from the tenant data storage 122 (e.g., Object table 305 and other tables). The Object table 305 may map to the Object_Archive table 405. In another example, the archive engine 310 creates a table in the second storage device 312 having the same name as the table from which the records were archived (e.g., "Object" table). Each of the archive records may be assigned an archive record ID and include the schema ID and data included in the original record. For example, the archive record 418 is assigned the archive record ID AR001 and includes the schema ID S001 and the data included in the original record 318, and the archive record 419 is assigned the archive record ID AR002 and includes the schema ID S001 and the data included in the original record 319.

After the records 418 and 419 have been archived into the second storage device 312, the archive engine 310 removes the original records 318 and 319 from the tenant data storage 122, as shown by the dashed lines. If the archive engine 310 is unable to remove a record, the archive engine 310 may log the removal failure into a log file for a re-try later. The message handler 403 continues to archive records by dequeuing remaining messages from the message queue 404.

D. Example Timing Diagram

Figure 5:
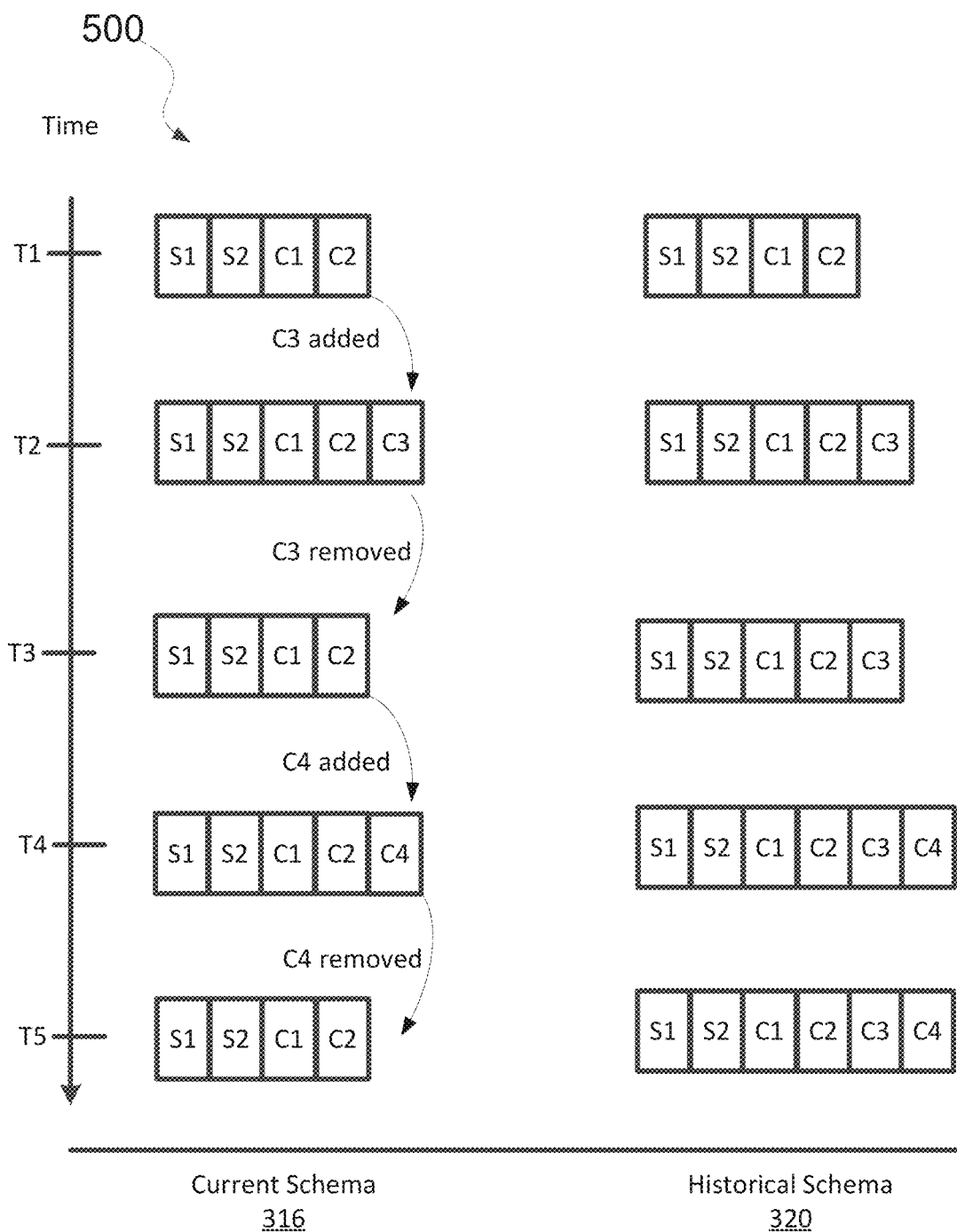
FIG. 5 illustrates a timing diagram of a current schema and a historical schema of an object over time based on field modifications according to some embodiments.

FIG. 5 illustrates a timing diagram 500 of the current schema 316 and the historical schema 320 of the object 314 over time based on field modifications according to some embodiments. At time T1, the current schema 316 is <S1, S2, C1, C2> and the historical schema 320 is <S1, S2, C1, C2>, as shown in FIG. 1. At time T2, in response to a user adding a custom field C3 to the current schema 316, the schema engine 308 updates the current schema 316 to define two standard fields and three custom fields <S1, S2, C1, C2, C3>. Additionally, the schema engine 308 updates the historical schema 320 by adding the new field C3 to an end of the historical schema 320 such that the new field occupies the last slot of the historical schema. The updated historical schema 320 becomes <S1, S2, C1, C2, C3>.

At time T3, in response to a user removing the custom field C3 from the current schema 316, the schema engine 308 updates the current schema 316 to define two standard fields and two custom fields <S1, S2, C1, C2>. The historical schema 320 includes a superset of the fields defined in the object 314 and accordingly remains the same. At a later point in time, the user may make the field C3 current again. If the historical field C3 is pulled back into the current set of fields, then the values that were previously archived for that field will be made available again, even though for a period of time in the past they were not available due to being in the historical set.

At time T4, in response to a user adding a custom field C4 to the current schema 316, the schema engine 308 updates the current schema 316 to define two standard fields and three custom fields <S1, S2, C1, C2, C4>. Additionally, the schema engine 308 updates the historical schema 320 by adding the new field C4 to an end of the historical schema 320 such that the new field occupies the last slot of the historical schema. The updated historical schema 320 becomes <S1, S2, C1, C2, C3, C4>. The historical schema 320 provides a timeline of the field modifications in the current schema 316 relative to each other. For example, the C4 field was added to the object 314 after the C3 field was added. Accordingly, the slot filled by the C4 field succeeds the slot filled by the C3 field in the historical schema 320. At time T5, in response to a user removing the custom field C4 from the current schema 316, the schema engine 308 updates the current schema 316 to define two standard fields and two custom fields <S1, S2, C1, C2>. The historical schema 320 remains the same.

From time T1 to T5, users may insert records into, remove records from, or modify records stored in the tenant data storage 122. The records inserted into the tenant data storage 122 are defined by the current schema 316 at the time of insertion. For example, between times T2 and T3, the records added are defined by two standard fields and three custom fields <S1, S2, C1, C2, C3>. Between times T3 and T4, the records added are defined by two standard fields and two custom fields <S1, S2, C1, C2>. Between times T4 and T5, the records added are defined by two standard fields and three custom fields <S1, S2, C1, C2, C4>. From time T5 until the next modification to the current schema of the object 314, the records added are defined by two standard fields and two custom fields <S1, S2, C1, C2>. The archive manager may archive at least some of these records into the second storage device 312.

E. Maintenance of Metadata and a Historical Schema

Figure 6:
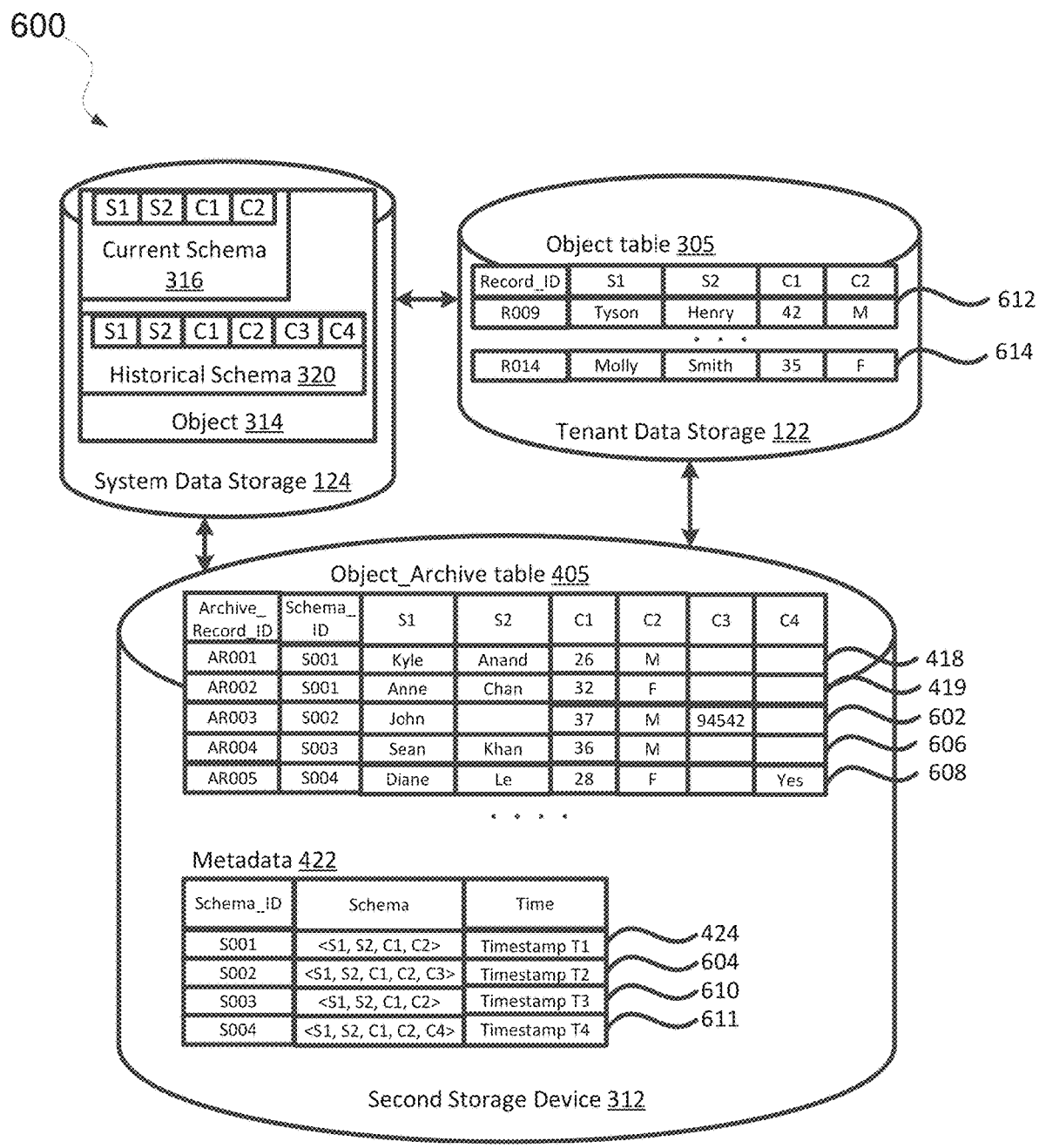
FIG. 6 illustrates a diagram for archiving records into the second storage device according to some embodiments.

FIG. 6 illustrates a diagram 600 for archiving records into the second storage device 312 according to some embodiments. To aid in understanding aspects of FIG. 6, FIG. 5 will be discussed in relation to FIG. 6. As shown in FIG. 6, each of archive records 418, 419, 602, 606, and 608 stored in the second storage device 312 may have the same (or common) or different schemas relative to each other. Each record's schema reflects the shape of the original entity at the time of the archive.

The archive record 602 is defined by a schema <S1, S2, C1, C2, C3> corresponding to time T2 in FIG. 5. The schema engine 308 assigns a Schema ID S002 to the schema <S1, S2, C1, C2, C3> and inserts into the metadata 422, a record 604 including the schema ID S002, the schema <S1, S2, C1, C2, C3>, and a timestamp T2 of the archive of the corresponding original record. The archive engine 310 archives the corresponding original record stored in the tenant data storage 122, assigns it an archive record ID AR003, includes the Schema ID S002 in the record 602, and removes the applicable record from the tenant data storage 122.

Additionally, the archive record 606 is defined by a schema <S1, S2, C1, C2> corresponding to time T3 in FIG. 5. The schema engine 308 assigns a Schema ID S003 to the schema <S1, S2, C1, C2> and inserts into the metadata 422, a record 610 including the schema ID S003, the schema <S1, S2, C1, C2>, and a timestamp T3 of the archive of the corresponding original record. The archive engine 310 archives the corresponding original record stored in the tenant data storage 122, assigns it an archive record ID AR004, includes the Schema ID S003 in the record 606, and removes the applicable record from the tenant data storage 122.

Additionally, the archive record 608 is defined by a schema <S1, S2, C1, C2, C4> corresponding to time T4 in FIG. 5. The schema engine 308 assigns a Schema ID S004 to the schema <S1, S2, C1, C2, C4> and inserts into the metadata 422, a record 611 including the schema ID S004, the schema <S1, S2, C1, C2, C4>, and a timestamp T4 of the archive of the corresponding original record. The archive engine 310 archives the corresponding original record stored in the tenant data storage 122, assigns it an archive record ID AR005, includes the Schema ID S004 in the record 608, and removes the applicable record from the tenant data storage 122.

Between time T1 and T2, between time T3 and T4, or after time T5, the user may insert records 612 and 614 into the tenant data storage 122. The records 612 and 614 are based on the current schema 316 of the object 314 corresponding to time T1, time T3, or time T5 in FIG. 5 and are assigned record IDs R009 and R014, respectively. Additionally, based on the removal of the C4 field in FIG. 5, the schema engine 308 updates the current schema 316 to <S1, S2, C1, C2> and the historical schema 320 to <S1, S2, C1, C2, C3, C4>.

III. Query Processing

It may be desirable to allow a user to access records stored in both the tenant data storage 122 and the second storage device 312. The query engine 306 may use the current schema 316 and the historical schema 320 of the object 314 to access records in both storage devices. Additionally, the query engine 306 allows the user to access data in a similar way in which the user originally accessed data from the tenant data storage 122.

During design time, users may modify or redefine fields of the current schema 316. The query engine 306 may determine, based on the historical schema 320, the physical structure of records stored in the second storage device 312. During runtime, the query engine 306 may account for changes to the current schema 316 that occurred during design time and execute queries submitted by users against the tenant data storage 122 and/or the second storage device 312. The query engine 306 receives a query from a user and decomposes the query to determine whether to submit the query to and retrieve a result set from the tenant data storage 122 and/or the second storage device 312. The query engine 308 may process the query and perform calculations for presenting a view of the data to a user.

The second storage device 312 may support dynamic columns, which may be added at runtime. For example, if during design time, a user modifies a field of the current schema 316 by, for example, adding a field, changing the data type, etc., the archive engine 310 may add a new column to the corresponding record in the Object_Archive table 405. Accordingly, the rows in the Object_Archive table 405 may have different schemas relative to each other.

A. Query the First Data Storage Storing Values For Current Fields

The query includes a command specifying a subset of fields or columns included in a set of records based on the object 314. The query engine 306 determines whether the current schema 316 of the object 314 includes the subset of fields. If so, the query engine 306 submits the query against the tenant data storage 122 and retrieves a result set of the query from the tenant data storage 122. If not, the query engine 306 determines that the second storage device 312 does not store data applicable to the query.

In an example, the query is a Structured Query Language (SQL) query (Q1): "SELECT S1, S2, C1, C2 FROM Object WHERE C1>30." The query engine 306 may receive the query Q1 from a user and retrieve a result set including values from the <S1, S2, C1, C2> fields in records 612 and 614. Records 612 and 614 include the specified fields and satisfy the condition C1>30. The result set of the query Q1 from the tenant data storage 122 may be {<S1='Tyson', S2='Henry', C1=42, C2='M', <S1='Molly', S2='Smith', C1=35, C2='F'>}. The query engine 306 may return the result set from the tenant data storage 122 to the user.

B. Query the Second Data Storage Storing Archive Records

The query engine 306 may reconstruct, based on the historical schema 320 and the metadata 422, the data stored in the archive records. The archive manager 304 and the query engine 306 may serialize, based on the historical schema 320 and the metadata 422, data in the second storage device 312. Additionally, the archive manager 304 and the query engine 306 may deserialize, based on the historical schema 320 and the metadata 422, the serialized records stored in the second storage device 312.

In some examples, the query engine 306 generates, based on the historical schema 320 and the metadata 422, a view of the archive data. In an example, the second storage device 312 is HBase, and the query engine 306 implements the open source SQL layer, providing a low-level operation that translates SQL statements into HBase raw scans (e.g., GETs and PUTs). If a field has a particular name and particular data type, the query engine 306 may create a specific column bound to that field in the record that has that particular name and data type. The query engine 306 translates the historical schema 320 and the metadata 422 into columns bounded to particular fields included in the correct schema. Each field in the historical schema 320 may be represented as Phoenix columns, which may be associated with a timestamp.

The query engine 306 may generate a view including all applicable columns defined in a record. If a field in the object 314 is modified (e.g., removed, data type modified, etc.), the query engine 306 may continue to generate a view including the column representing the modified field. Accordingly, the query engine 306 may reconstruct, based on the historical schema 320 and the metadata 422, views including columns corresponding to current and non-current fields. Any of the columns included in a view may be queried for data. Accordingly, fields that no longer exist on an object 314 may be queried and the applicable data returned to a user. The view defines the serialization format for the row, and the view may provide a superset of all current and historical fields.

The user may submit a query including a command specifying a subset of fields based on the object. Additionally, the query may indicate one or more non-current fields, where non-current fields are absent from the current schema. In an example, the query includes a backdoor field that maps to a non-current field. The current schema and the historical schema are devoid of the backdoor field. In another example, the query includes the non-current field. The query engine 306 may obtain the query and process the query.

1. The Subset of Fields Specified in the Query Matches the Current Fields

In an example, the query engine 306 submits the query Q1 to the second storage device 312. In this example, the query engine 306 may receive an error because the second storage device 312 does not store an Object table. In another example, the archive manager 304 may maintain table mappings, where a table mapping includes an entry including an original table name from which an original record is archived and an archive table name storing the applicable archive record. For example, the archive manager 304 may map the Object table 305 to the Archive_Object table 405. The query engine 306 may rewrite the query Q1 by determining that the Object table stored in the tenant data storage 122 maps to the Object_Archive table 405 stored in the second storage device 312. The query engine 306 may rewrite the query Q1 by replacing the Object table with the Object_Archive table, resulting in the rewritten query (RQ1): "SELECT S1, S2, C1, C2 FROM Object_Archive WHERE C1>30."

In some examples, the user submits the query Q1 to the tenant data storage 122. The query engine 306 may obtain the query Q1 and submit the query Q1 to the tenant data storage 122, rewrite the Q1 to RQ1, and submit the RQ1 to the second storage device 312. The query engine 306 may retrieve a first result set from the tenant data storage 122 and a second result set from the second storage device 312. The query engine 306 may return a final result set to the user, the final result set being based on the first and second result sets.

In some examples, the user includes the name of the table stored in the second storage device 312. In an example, the user may submit a query (Q2): "SELECT S1, S2, C1, C2 FROM Object_Archive WHERE C1>30." The fields included in the historical schema 320 are in an order that is followed by the records to ensure that when data is pulled, the query engine 306 knows which fields specified in the query map to which fields/slots in the record. For the query Q2, the query engine 306 determines whether the subset of fields specified in the query is included in the historical schema 320. If so, the query engine 306 may search the metadata 422 for schemas that match the subset of fields specified in the query. A schema matches the subset of fields specified in the query Q2 if the schema includes the subset of fields <S1, S2, C1, C2>. The query engine 306 may determine the Schema IDs assigned to the matching schemas and retrieve a result set including archive records that include the Schema IDs and satisfy the conditions in the query.

In this example, the query engine 306 identifies Schema IDs S001, S002, S003, and S004 as being assigned to a schema including the fields <S1, S2, C1, C2> specified in the query Q2. The query engine 306 retrieves a result set including values from the fields <S1, S2, C1, C2> in records 419, 602, and 606, which include Schema ID S001, S002, S003, or S004 and also satisfy the condition C1>30. The result set of the query Q2 from the Object_Archive table 405 stored in the second storage device 312 may be {<S1='Anne', S2='Chan', C1=32, C2='F'>, <S1='John', S2=null, C1=37, C2='M'>, <S1='Sean', S2='Khan', C1=36, C2='M'>}. The query engine 306 may return the result set from the second storage device 312 to the user.

2. The Subset of Fields Specified in the Query Includes a Backdoor Field

As fields in the object 314 are modified, the query engine 306 may successfully query archive records storing data that may not be exposed on the current schema 316 of the object 314. The query engine 306 may read the historical schema 320 and the metadata 422 in relation to a command (e.g., a read or a write command) and apply the correct schema on the data in accordance with the command. The query engine 306 may translate the historical schema 320 and/or the metadata 422 into a storage layer that allows a query "back in time." A user may believe that any removed fields are no longer relevant because they were removed, but these removed fields are still relevant in the second storage device 312 to decode serialized records storing that information.

In some examples, the query engine 306 exposes a backdoor field that the user may include in a query to retrieve values from fields that are not in the current schema 316 of the object 314. The backdoor field may be optional. For example, if the user does not specify the backdoor field in the query, then the backdoor field is not computed and no value is returned for any non-current fields. If the user specifies the backdoor field in the query, the user may access fields that no longer exist in the current schema 316 of the object 314. In an example, the backdoor field is of a JSON field type. As long as the user performing the query has knowledge of the backdoor field, the user may access non-current fields of the object 314 to retrieve their stored values. If the user specifies the backdoor field in a query, the query engine 306 may retrieve the values to which the backdoor field is mapped (e.g., values in the non-current fields).

Referring to FIGS. 5 and 6, at time T3, the user may submit a query (Q3): "SELECT S1, S2, C1, C2, backdoor FROM Object_Archive WHERE S1='John'." The query engine 306 may submit the query Q3 to the second storage device 312. In an example, the backdoor field may be mapped to the non-current fields of the object 314. The query engine 306 may retrieve, based on one or more candidate schemas, a result set for the query Q3. The query engine 306 may determine one or more candidate schemas by searching the metadata 422 for a schema including the specified fields <S1, S2, C1, C2> and one or more additional fields. The candidate schemas may be schema <S1, S2, C1, C2, C3> and schema <S1, S2, C1, C2, C4>, which are identified by Schema IDs S002 and S004, respectively. The query engine 306 searches the Object_Archive 405 for one or more records including the Schema IDs S002 and S004 and satisfying the condition S1='John'. In this example, a result set of the query Q3 from the second storage device 312 may correspond to the record 602 and may be {<S1'John', S2=null, C1=37, C2='M', backdoor='{C3: "94542"}'>}. Accordingly, the result set includes the values of the fields that were specified in the query along with the value for the non-current C3 field. If the record 602 included more non-current fields aside from the non-current field C3, the query engine 306 may also provide values for these one or more non-current fields in the result set.

In another example, the backdoor field may be mapped to the current and the non-current fields of the object 314. In this example, a result set of the query Q3 from the second storage device 312 may be {<S1='John', S2=null, C1=37, C2='M', backdoor='{S1:"John", S2: null, C1:"37", C2:"M", C3:"94542"}'>}. The current schema and the historical schema may be devoid of the backdoor field. Accordingly, the object 314 does not include the backdoor field in its schema. For example, the backdoor field is not an actual field that is included in the current schema of the object 314, but is used as a mechanism for gaining access to historical fields.

3. The Subset of Fields Specified in the Query Includes a Non-Current Field

In some examples, the user specifies a non-current field in the query. In this example, as long as the user has knowledge of the name of a non-current field for specification in the query, the user may retrieve values stored in the non-current fields from the archive records. The user may submit a query (Q4): "SELECT S2, C3 FROM Object_Archive. The query engine 306 may determine one or more candidate schemas by searching the metadata 422 for a schema including the specified field S2 and the specific non-current field C3. The candidate schema may be schema <S1, S2, C1, C2, C3>, which is the only schema including the non-current field C3 and is identified by the Schema ID S002. The query engine 306 searches the Object_Archive 405 for one or more records including the Schema ID S002 and satisfying conditions specified in the query. In this example, a result set of the query Q4 from the second storage device 312 may be {<S2=null, C3=94542>}.

C. Standard Full Record Field

Figure 7:
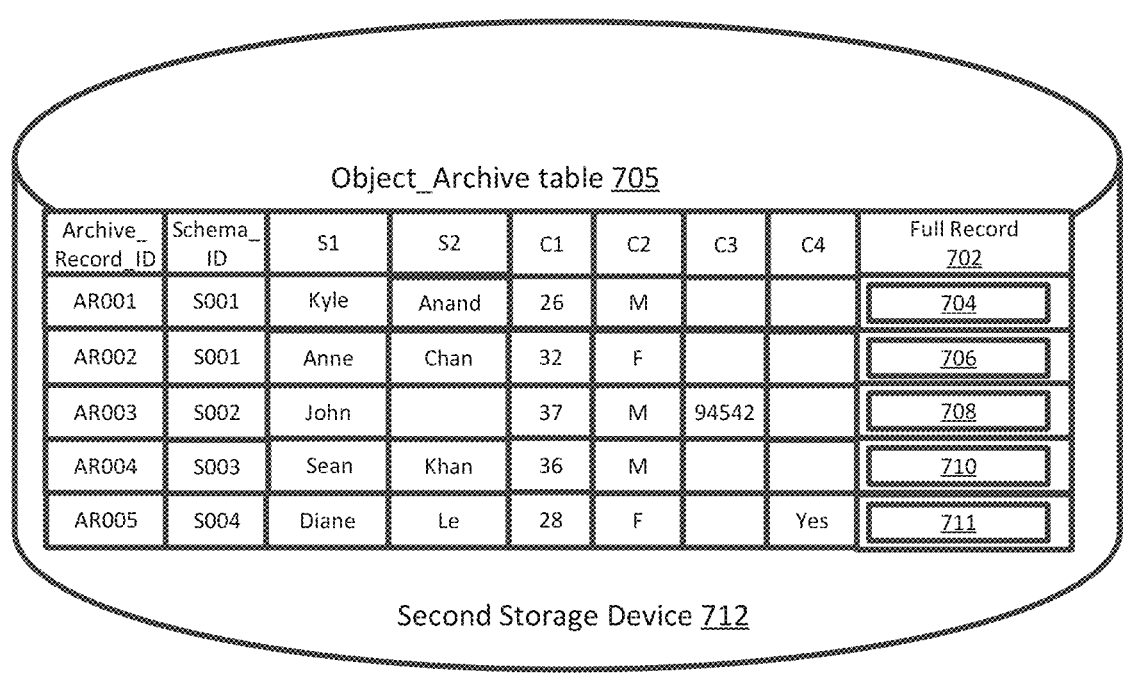
FIG. 7 illustrates a diagram for storing a full record field in an archive record according to some embodiments.

In some examples, each archive record includes a standard full record field containing data stored in fields corresponding to the original record. FIG. 7 illustrates a diagram 700 for storing a full record field 702 in an archive record according to some embodiments. In the example illustrated in FIG. 7, an Object_Archive table 705 is stored in a second storage device 712. The Object_Archive table 705 includes one or more archive records, each having a set of standard and custom fields. In the Object_Archive table 705, the full record field 702 may be of a JSON field type and contain a fully serialized immutable archive record that provides a JSON representation of the data. The full record field 702 may contain the values corresponding to a schema snapshot and the schema snapshot. The schema snapshot is a snapshot of the schema at the point in time view of the record. The data stored in fields of the object 314 at the time of archive may be duplicated in the corresponding full record field 702. By utilizing the full record field 702, the archive manager 304 may maintain a snapshot of the record exactly as it was at the point of archive and allows access to field values where the metadata no longer exists on the original entity for those fields (e.g., on custom field deletion).

The Object_Archive table 705 may store the data for fields S1, S2, C1, C2, C3, and/or C4 as shown in FIG. 7. Each of the full records 702 may be immutable and store the data for fields S1, S2, C1, C2, C3, and/or C4 in a serialized format. For example, a record 704 may store the values <S1='Kyle', S2='Anand', C1=26, C2='M'> for the applicable fields in a serialized format, a record 706 may store the values <S1='Anne', S2='Chan', C1=32, C2='F'> for the applicable fields in a serialized format, a record 708 may store the values <S1='John', S2=null, C1=37, C2='M', C3='94542'> for the applicable fields in a serialized format, a record 710 may store the values <S1='Sean', S2='Khan', C1=36, C2='M'> for the applicable fields in a serialized format, and a record 711 may store the values <S1='Diane', S2='Le', C1=28, C2='F', C4='Yes'> for the applicable fields in a serialized format. If the user submits a query specifying the full record field 702, the query engine 306 may return the values stored in the applicable full record (e.g., record 704, 706, 708, 710, and/or 711).

In an example, for the query (Q4): "SELECT full_record FROM Object_Archive WHERE C2='F', the query engine 306 may submit the query Q4 against the second storage device 712. A result set of the query may include the full records 706 and 711.

IV. Versions of an Object in a Multi-Tenancy

An object may be specific to tenants and their business practices. Each tenant may control and customize its own version of the object 314 and may add fields to, remove fields from, and/or modify custom fields (e.g., change a data type) within the version controlled by the tenant. The schema engine 308 and the archive engine 310 may maintain an object 314 for multiple tenants and separately track changes to the object 314 per-tenant. In relation to FIGS. 3-7, although not explicitly shown, the schema engine 308 and the archive engine 310 may maintain different tenant-specific versions of the object 314 and archive records at a tenant-specific level.

Figure 8:
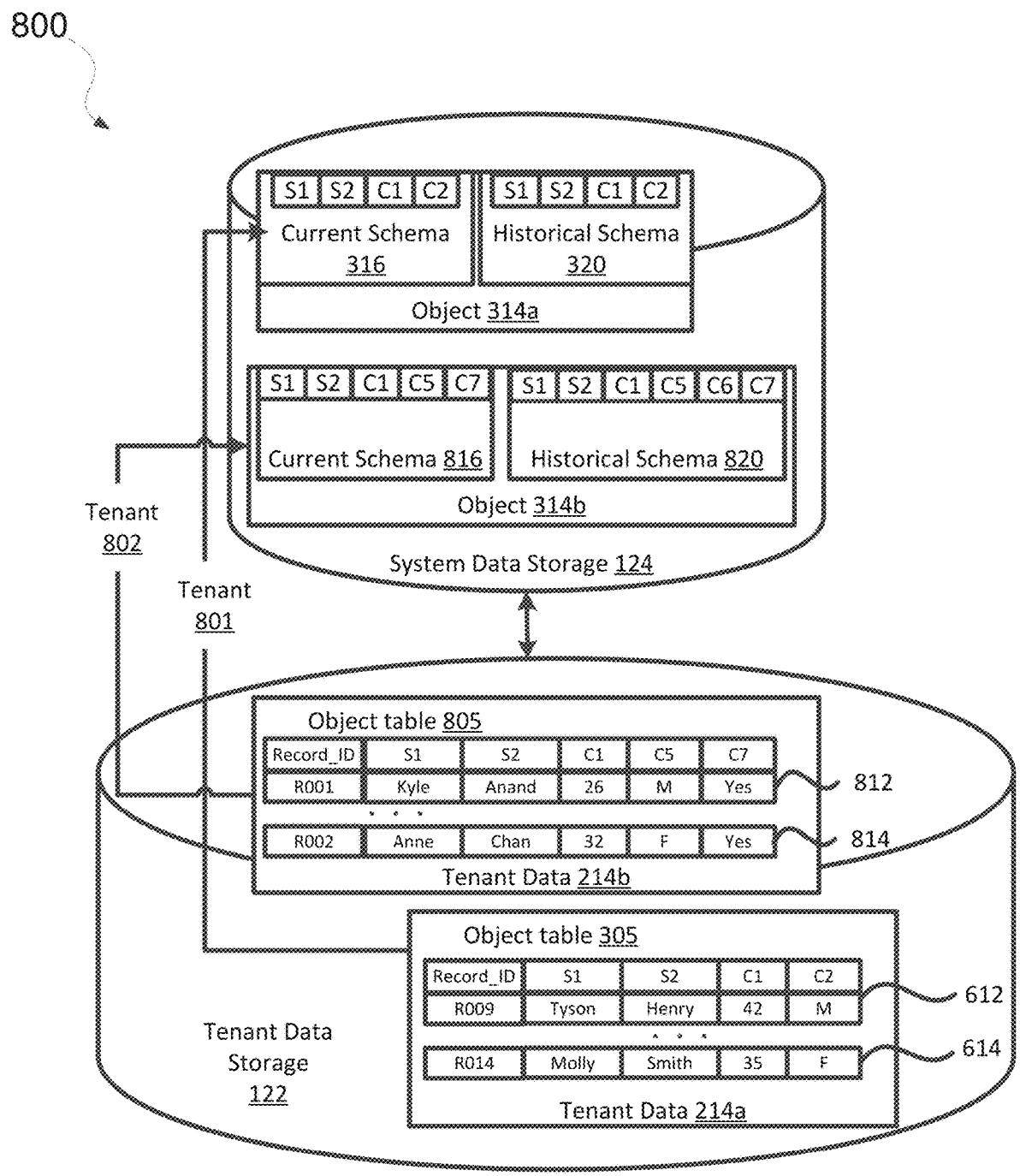
FIG. 8 illustrates a diagram for archiving one or more records stored in a tenant data storage according to some embodiments.

FIG. 8 illustrates a diagram 800 for archiving one or more records stored in the tenant data storage 122 according to some embodiments. The tenant data storage 122 may be a MTS, and the schema engine 308 may maintain the current schema 316 and the historical schema 320 for the object 314 per-tenant. Each tenant may have its own view of an object, and as tenants customize their objects, the schema engine 308 tracks their corresponding historical schemas and metadata. Metadata may be maintained to reflect the changes made by each tenant to its object version. Tenants may provide an indication to archive their version of the object. In this example, an archive manager may snapshot a schema of each of the object versions, where each schema includes the set of standard fields and a set of custom fields specific to a particular tenant of the MTS. By taking a snapshot of each schema corresponding to a particular tenant, the archive manager is able to maintain the tenant's set of custom fields.

The current schemas and historical schemas for each of the object versions may be stored in the system data storage 214. For example, for a tenant 801, the schema engine 308 may maintain the current schema 316, the historical schema 320, and the metadata 422 for the tenant 801's version of the object 314a (as shown in FIGS. 3-7). For a tenant 802, the schema engine 308 may maintain a current schema 816, a historical schema 820, and the metadata for the tenant 802's version of the object 314b. The tenant 801's current schema and historical schema of the object 314a may be different from the tenant 802's. Each tenant's schema may include a common set of standard fields (e.g., S1 and S2 fields), but the object 314's customized fields may differ based on what kind of data the tenant desires to store. The tenant 802 may customize its version of the object 314b such that its schema defines two standard fields and three custom fields, <S1, S2, C1, C5, C7>. Accordingly, for the tenant 802's version of the object 314b, the current schema 816 is <S1, S2, C1, C5, C7> and the historical schema 820 is <S1, S2, C1, C5, C6, C7>.

Additionally, the archive engine 310 may maintain tenant data 214a for the tenant 801 and maintain tenant data 214b for the tenant 802. Referring to FIG. 4, the memory scanner 402 maintains a list of tenants (e.g., tenant IDs) and records for archiving, and the message queues 404 may be specific to a tenant. The archive engine 310 may archive records based on the object 314, per-tenant.

The archive manager 304 and the query engine 306 may maintain and retrieve data that is specific to a tenant. The query engine 308 may submit, based on the historical schema and the metadata of an object for a particular tenant, queries to the tenant data storage 122 and/or the second storage device as discussed in the present disclosure. Additionally, the query engine 306 may retrieve, based on the historical schema and the metadata of an object for a particular tenant, the applicable information as discussed in the present disclosure.

If the tenant 801 accesses its own data, other tenants storing data in the system data storage 124, the tenant data storage 122, and/or the second storage device 312 activity be unaffected in terms of performance or reliability. In some examples, the query engine 306 utilizes tenant-specific views and maintains a middle layer to create a mapping between the modifications in the tenant's customized object. The intermediate layer may maintain these mappings that include the versioning of the schemas and is applied appropriately for a given tenant. The query engine 306 utilizes the middle layer for operating on a particular object, with each tenant having its own list of changes.

The archive manager 304 may archive original records stored in the Object table 805 into the second storage device 312 (e.g., in the Object_Archive table 405). In some examples, the archive data (e.g., archive records stored in the Object_Archive table 405) may have the same view, but the accessed view will change per tenant. The query engine 306 applies the customizations implemented on the object 314 by a tenant for providing the tenant's view of the result set of a query.

V. Operational Flow

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Figure 9:
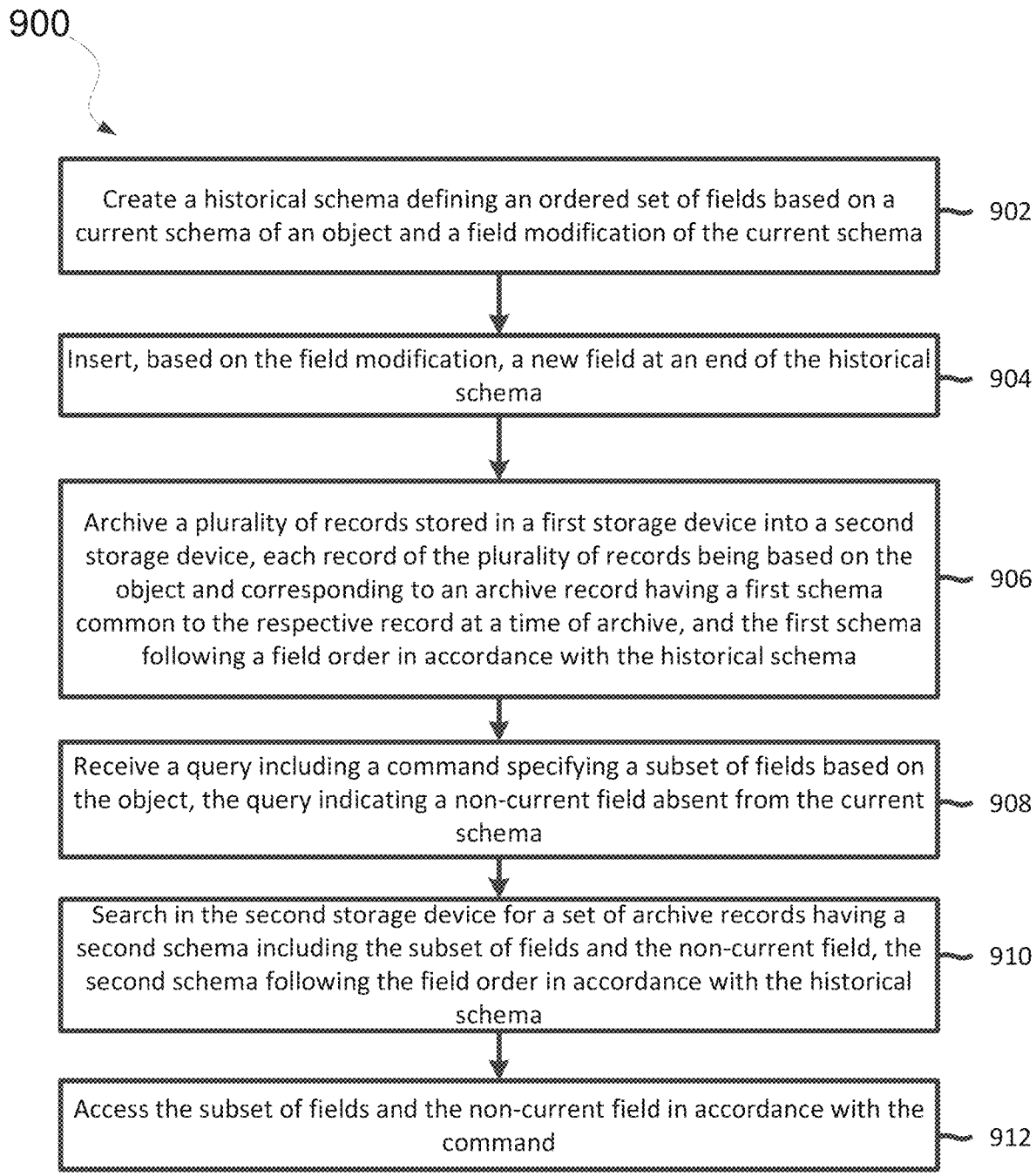
FIG. 9 is a flowchart of a method for processing a query according to some embodiments.

FIG. 9 is a flowchart of a method 900 for processing a query according to some embodiments. One or more of the processes 902-912 of the method 900 may be implemented, at least in part, in the form of executable code stored on non-transitory, tangible, machine-readable media that when run by one or more processors may cause the one or more processors to perform one or more of the processes 902-912. In some embodiments, method 900 can be performed by one or more computing devices in systems or diagrams 100, 200, 300, 400, 600, 700, and 800 of FIGS. 1, 2, 3, 4, 6, 7, and 8, respectively, including the archive engine 310, the schema engine 308, and/or the query engine 306. Aspects of the processes 902-912 of method 900 have been covered in the description for FIGS. 1, 2, 3, 4, 5, 6, 7, and 8; and additional aspects are provided below.

At a process 902, a computing device (e.g., via schema engine 308) creates a historical schema defining an ordered set of fields based on a current schema of an object and a field modification of the current schema. The field modification of a current schema may refer to an addition of a field to an object, a removal of a field from the object, or a field definition modification (e.g., change in data type, change in the field's name, etc.). The current schema 316 and the historical schema 320 are dynamic and may change over time. The archive manger 304 may maintain the current schema 316 and the historical schema 320 for an object on a per-tenant basis.

At a process 904, a computing device (e.g., via schema engine 308) inserts, based on the field modification, a new field at an end of the historical schema. The schema engine 308 may determine the historical schema by snapshotting the current schema and adding fields to an end of the historical schema, which defines a superset of fields that have been defined in the object. The schema engine 308 may perform this action, per object and per tenant. Additionally, the order of the fields in the historical schema remains the same.

At a process 906, a computing device (e.g., via archive engine 310) archives a plurality of records stored in a first storage device into a second storage device, each record of the plurality of records being based on the object and corresponding to an archive record having a first schema common to the respective record at a time of archive, and the first schema following a field order in accordance with the historical schema. Accordingly, the query engine 306 may determine, based on the historical schema, the physical structure of records stored in a second storage device.

At a process 908, a computing device (e.g., via query engine 306) receives a query including a command specifying a subset of fields based on the object, the query indicating a non-current field absent from the current schema. The non-current field may be inaccessible via the tenant data storage 122 because it is no longer exposed via the current schema of the object. In an example, the query includes a backdoor field that maps to the non-current field(s) of the object. The current schema and the historical schema may be devoid of the backdoor field. The backdoor field may map to the current schema of the object as well as the non-current fields of the object. In another example, the query includes the non-current field. In some examples, the subset of fields may include the non-current field. In some examples, the subset of fields is separate from the non-current field.

At a process 910, a computing device (e.g., via query engine 306) searches in the second storage device for a set of archive records having a second schema including the subset of fields and the non-current field, the second schema following the field order in accordance with the historical schema. In an example, the query engine 306 searches metadata corresponding to the object for the second schema including the subset of fields and identifies a schema ID that identifies the second schema. The set of archive records may include the schema ID and satisfy the conditions specified in the query. The metadata may include one or more entries, each entry including a given schema ID assigned to a given schema, the given schema, and a timestamp corresponding to a given time at which at least one archive record defined by the given schema was archived.

In some examples, at least one archive record corresponding to an original record of the plurality of records includes a full record containing values from the original record corresponding to the first schema. The full record contains a serialized immutable archive record storing the values and may be of a JSON type.

At a process 912, a computing device (e.g., via query engine 306) accesses the subset of fields and the non-current field in accordance with the command. In an example, the query engine 306 may return values for each field of the subset of fields and return a value for each non-current field indicated in the query in a result set to the user.

In some embodiments, one or more actions illustrated in processes 902-912 may be performed for any number of objects per-tenant. It is also understood that additional processes may be performed before, during, or after processes 902-912 discussed above. It is also understood that one or more of the processes of method 900 described herein may be omitted, combined, or performed in a different sequence as desired.

For example, each tenant may customize and maintain its own version of the object 314 in accordance with the data the tenant desires to store and maintain. As discussed, the archive manager 304 and the schema engine 308 may maintain a historical schema and a current schema of the object 314 for each tenant. In an example, the schema engine 308 creates the historical schema 820 defining a second ordered set of fields based on the current schema 816 of the object 314*b* and a second field modification of the current schema 816. The historical schema 320 and the current schema 316 may be based on the first tenant 801's version of the object 314*a*, and the historical schema 820 and the current schema 816 may be based on the second tenant 802's version of the object 314*b*. Additionally, the current schema 316 and the current schema 816 may include a common set of standard fields <S1, S2>.

The schema engine 308 may insert, based on the second field modification, a second new field at an end of the second historical schema to update the historical schema 820. Additionally, the archive engine 310 may archive a second plurality of records stored in the first storage device into the second storage device, where each record of the second plurality of records is based on the second tenant's version of the object 314*b* and corresponds to an archive record having a third schema common to the respective record at a second time of archive, and where the third schema follows a second field order in accordance with the historical schema 820.

The query engine 306 may receive a second query including a second command specifying a second subset of fields based on the second tenant's version of the object 314*b*. The second query may indicate a second non-current field absent from the second current schema 816. In response to the second query, the query engine 306 may search in the second storage device for a second set of archive records having a fourth schema including the second subset of fields and the second non-current field, where the fourth schema follows the second field order in accordance with the historical schema 820. Additionally, the query engine 306 may access the second subset of fields and the second non-current field in accordance with the second command.

Unless specifically stated otherwise as apparent from the following discussion, it is appreciated that throughout the description, discussions utilizing terms such as "determining," "creating," "inserting," "archiving," "receiving," "comparing," "identifying," "searching," "accessing," "submitting," "removing," "snapshotting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising:
   a memory configured to store, for an object, a plurality of archive records of tenant-specific object versions comprising first tenant-specific object version having a first historical schema, a first current schema and first metadata; and
   one or more processors coupled to the memory and configurable to execute the machine executable code to cause the one or more processors to:
     receive a query including a command specifying a subset of fields based on the object;
     determine, by decomposing the query into the subset of fields, whether the query includes a non-current field absent from the current schema;
     search, the plurality of tenant-specific object versions in the memory, for at least one tenant-specific object version including the subset of fields and the non-current field according to timestamps included in metadata associated with the tenant-specific object versions; and
     access the subset of fields and the non-current field in accordance with the command.

2. The computing device of claim 1, wherein the first current schema comprises a field modification from the first historical schema, the field modification including at least one of an addition of a field to the object, a modification of a definition of the field, or removal of the field from the object.

3. The computing device of claim 1, wherein the machine executable code further causes the one or more processors to:
   snapshot the first current schema, wherein the first historical schema includes the snapshot and at least one new field inserted at the end of the historical schema.

4. The computing device of claim 1, wherein the machine executable code further causes the one or more processors to:
   search the first metadata for a second schema including the subset of fields; and
   identify a schema identifier (ID) that identifies the second schema, the set of archive records including the schema ID.

5. The computing device of claim 4, wherein the first metadata includes one or more entries, each entry including a given schema ID assigned to a given schema, the given schema, and a timestamp corresponding to a given time at which at least one archive record defined by the given schema was archived.

6. The computing device of claim 1, wherein the query includes a backdoor field that maps to the non-current field, and wherein the current schema and the historical schema are devoid of the backdoor field.

7. The computing device of claim 6, wherein the machine executable code further causes the one or more processors to:
   access a set of fields specified in the first current schema in accordance with the command, wherein the backdoor field maps to the first current schema of the object.

8. A method comprising:
   accessing, from a memory, for an object, a plurality of archive records of tenant-specific object versions comprising first tenant-specific object version having a first historical schema, a first current schema and first metadata; and
   receiving a query including a command specifying a subset of fields based on the object;
   determining, by decomposing the query into the subset of fields, whether the query includes a non-current field absent from the current schema;
   searching, the plurality of tenant-specific object versions in the memory, for at least one tenant-specific object version including the subset of fields and the non-current field according to timestamps included in metadata associated with the tenant-specific object versions; and
   accessing the subset of fields and the non-current field in accordance with the command.

9. The method of claim 8, wherein the first current schema comprises a field modification from the first historical schema, the field modification including at least one of an addition of a field to the object, a modification of a definition of the field, or removal of the field from the object.

10. The method of claim 8, further comprising:
    taking a snapshot of the first current schema, wherein the first historical schema includes the snapshot and at least one new field inserted at the end of the historical schema.

11. The method of claim 8, further comprising:
    searching the first metadata for a second schema including the subset of fields; and
    identifying a schema identifier (ID) that identifies the second schema, the set of archive records including the schema ID.

12. The method of claim 11, wherein the first metadata includes one or more entries, each entry including a given schema ID assigned to a given schema, the given schema, and a timestamp corresponding to a given time at which at least one archive record defined by the given schema was archived.

13. The method of claim 8, wherein the query includes a backdoor field that maps to the non-current field, and wherein the current schema and the historical schema are devoid of the backdoor field.

14. The method of claim 13, further comprising:
accessing a set of fields specified in the first current schema in accordance with the command, wherein the backdoor field maps to the first current schema of the object;
search the first metadata for a second schema including the subset of fields; and
identify a schema identifier (ID) that identifies the second schema, the set of archive records including the schema ID.

15. A non-transitory processor-readable storage medium storing a plurality of processor-executable instructions, the processor-executable instructions being executed by a processor to:
access, for an object, a plurality of archive records of tenant-specific object versions comprising first tenant-specific object version having a first historical schema, a first current schema and first metadata;
receive a query including a command specifying a subset of fields based on the object;
determine, by decomposing the query into the subset of fields, whether the query includes a non-current field absent from the current schema;
search, the plurality of tenant-specific object versions in the memory, for at least one tenant-specific object version including the subset of fields and the non-current field according to timestamps included in metadata associated with the tenant-specific object versions; and
access the subset of fields and the non-current field in accordance with the command.

16. The non-transitory processor-readable medium of claim 15, wherein the first current schema comprises a field modification from the first historical schema, the field modification including at least one of an addition of a field to the object, a modification of a definition of the field, or removal of the field from the object.

17. The non-transitory processor-readable medium of claim 15, wherein the processor-executable instructions are further executed by the processor to:
snapshot the first current schema, wherein the first historical schema includes the snapshot and at least one new field inserted at the end of the historical schema.

18. The non-transitory processor-readable medium of claim 15, wherein the processor-executable instructions are further executed by the processor to:
search the first metadata for a second schema including the subset of fields; and
identify a schema identifier (ID) that identifies the second schema, the set of archive records including the schema ID.

19. The non-transitory processor-readable medium of claim 18, wherein the first metadata includes one or more entries, each entry including a given schema ID assigned to a given schema, the given schema, and a timestamp corresponding to a given time at which at least one archive record defined by the given schema was archived.

20. The non-transitory processor-readable medium of claim 15, wherein the query includes a backdoor field that maps to the non-current field, and wherein the current schema and the historical schema are devoid of the backdoor field.

* * * * *